United States Patent [19]

McMillan

[11] 4,067,164
[45] Jan. 10, 1978

[54] COMPOSITE PANELS FOR BUILDING CONSTRUCTIONS

[75] Inventor: William J. McMillan, Midland, Mich.

[73] Assignee: The Dow Chemical Company, Midland, Mich.

[21] Appl. No.: 617,334

[22] Filed: Sept. 24, 1975

[51] Int. Cl.² .............................................. E04C 2/20
[52] U.S. Cl. .................................. 52/309.12; 52/453; 260/29.7 S; 260/42.13; 428/161; 428/320
[58] Field of Search ................. 52/309, DIG. 7, 453, 52/309.12; 260/42.13, 29.7 S; 428/159, 158, 161, 163, 310, 315, 320, 321

[56] References Cited

U.S. PATENT DOCUMENTS

| Re. 28,722 | 2/1976 | Sanders | 260/42.13 |
|---|---|---|---|
| 1,978,625 | 10/1934 | Dean | 52/453 |
| 3,043,790 | 7/1962 | Sanders | 260/29.7 S |
| 3,150,032 | 9/1964 | Rubenstein | 52/DIG. 7 |
| 3,309,827 | 3/1967 | Nicosia | 52/309 |
| 3,870,553 | 3/1975 | Hussey | 260/29.7 S |

Primary Examiner—John E. Murtagh
Attorney, Agent, or Firm—Ronald G. Brookens

[57] ABSTRACT

The invention relates to composite panels for building constructions and more particularly to panels comprising a main body portion of a closed cell generally smooth skinned foam material having along at least one surface thereof a protective cementitious facing material adhered thereto; such panels being particularly adapted for use in roofing and curtain wall construction.

8 Claims, No Drawings

COMPOSITE PANELS FOR BUILDING CONSTRUCTIONS

BACKGROUND OF THE INVENTION

In the preparation of composite panels for building construction comprising a cementitious facing material adhered to a generally smooth skinned foam material such as a styrene polymer foam, difficulty is experienced in obtaining an adequate and permanent bond between the contacting surfaces of the dissimilar materials. This is due at least in part to the fact that the prior known cementitious materials in setting, tend to shrink whereas the foam surface with which it comes in contact does not undergo a corresponding shrinkage. Also, the differences between the coefficients of thermal expansion between the two types of materials often provides a severe shearing stress which results in failure of the bond between the materials.

SUMMARY OF THE INVENTION

In accordance with the present invention, delamination resistant composite panels for use in building constructions are prepared comprising a main body portion of a closed cell generally smooth skinned foam material having adhered to at least one surface thereof a protective cementitious facing material. Preferably, the cementitious facing material consists essentially of an admixture of a portland cement, mineral aggregate, from about 5 to about 25 percent based on the weight of cement of a styrene-butadiene-1,3 copolymer having a styrene to butadiene weight ratio of about 30:70 to 70:30, water in amount of from about 25 to about 65 percent based on the weight of cement, and based on the weight of copolymer, (a) from about 2 to about 10 percent of non-ionic surfactant, (b) from about 0.75 to 7.5 percent of anionic surfactant, at least about 15 percent of which is sodium alkyl sulfate in which the alkyl group contains 9 to 17 carbon atoms, and (c) from about 0.1 to 5 percent of a polyorganosiloxane foam depressant based on the weight of active polyorganosiloxane, the sum of (a) and (b) not exceeding about 11 percent by weight of copolymer and the weight ratio of (a) to (b) being within the range of about 0.7:1 to 10:1.

Particularly preferred results are obtained wherein the styrene-butadiene-1,3 copolymer modified portland cement is a shrinkage compensating portland cement and wherein such cement contains sufficient reinforcement to provide restraint against expansion.

The invention further contemplates a process of preparing such panels comprising providing along the surface of the foam material to be placed adjacent the protective layer, one or more regions having indentations therein, preferably wherein such indentations are in the form of an undercut wherein a portion of the protective coatings is ultimately contained in such undercut.

DESCRIPTION OF PREFERRED EMBODIMENTS

The foam material employed in the practice of this invention is any closed cell, generally smooth skinned foam such as the styrene polymer foams, styrene-acrylonitrile copolymer foams, styrene-methylmethacrylate copolymer foams, polyvinylchloride foams, polyurethane foams, polyethylene foams, phenolic foams and other materials available in cellular foam form which are known in the art, inclusive of the ceramic foams and foam glass.

For obtainment of optimum bonding, the surface of the foam to which the cementitious material is to be applied is provided with a plurality of indentations therein. Such indentations may be of a wide variety of shapes, sizes and frequency. More particularly, the surface of the foam may be punched, drilled, stamped, milled, routed, scored or cut to provide such indentations. Further, heated projections of varying configuration may be used to form indentations by melting a portion of the foam insulation. A particularly useful means for placing indentations in the foam is to pass the foam along a forwarding roll having longitudinal projections thereon. This method is particularly useful for placing indentations in styrene polymer foam due to the inherent resiliency of such foam material. Thus, such foam is initially compressed under a projection having a substantially square contact area, then pushed in a forward direction. The resulting combination of compression and resiliency causes the foam to tear away from the edge of the initial hole, thereby making a hole larger in diameter at the bottom than at the top. The shape of the hole thus resembles a trapezoid with the short parallel side of the hole opening at the foam surface.

The cementitious layer utilized by the present invention may be may hydraulic cement inclusive by any of the "portland cement" materials, however optimum results are obtained by utilization of a cementitious material modified with the prescribed styrene-butadiene-1,3 copolymer and particularly those copolymer modified cements comprised essentially of an admixture of a shrinkage compensating portland cement, mineral aggregate and from 5 to 25 percent based on the weight of cement of the styrene-butadiene-1,3 copolymer latex as specifically described supra and from about 0.1 to 5 percent of a polyorganosiloxane foam depressant based on the weight of active polyorganosiloxane, along with sufficient reinforcement to provide restraint against expansion.

Utilization of the herein prescribed copolymer latexes in conventional portland cement, mortar compositions is disclosed in U.S. Pat. No. 3,043,790.

Shrinkage compensating cements which may be utilized include the following:

Type K: This is a mixture of portland cement compounds, anhydrous calcium sulfoaluminate (4CaO.3Al$_2$O$_3$.SO$_3$), calcium sulfate (CaSO$_4$), and lime (CaO). The anhydrous calcium sulfoaluminate is a component of a separately burned clinker that is interground or blended with portland cement clinker. Alternatively, it may be formed simultaneously with the portland clinker compounds.

Type M: Either a mixture of portland cement, calcium aluminate cement and calcium sulfate or an interground product made with portland cement clinker, calcium aluminate clinker and calcium sulfate.

Type S: A portland cement containing a large tricalcium aluminate content and modified by an excess of calcium sulfate above usual amounts found in other portland cements.

If such shrinkage compensating cement compositions are not properly restrained, they literally expand themselves apart so that their potential strength is seriously impaired or totally lost. In generaly, any conventional reinforcing material such as, for example, deformed bar, rods, or wire mesh, in the proper amounts and properly installed will provide restrain sufficient to maintain compositional strength and integrity. Fiber reinforcing materials, such as steel fibers or alkali resistant glass fibers, also provide sufficient restraint. Fibrous types can be added to the composition during the mixing stage and hence, will be evenly dispersed and become an integral constituent of the composition. These fibers are randomly oriented and will provide three dimensional restraint.

It has also been found that the combination of alkali resistant glass fiber reinforcement and latex modification creates an unexpectedly benefical effect.

It has further been found that properly restrained modified shrinkage compensating cement compositions possess significantly increased freeze-thaw resistance, flexural strengths and water absorption characteristics.

The amount of water employed in preparing the shrinkage compensating cement compositions is also important with regard to providing compositions of optimum workability. In this regard at least 25 percent water, based on the weight of shrinkage compensating cement, is required with an amount from 35 to 65 percent being preferred.

Some or all of the non-ionic and anionic surfactants employed in the cement compositions can be present while effecting copolymerization of the styrene and butadiene. Ordinarily, however, it is preferred to follow the practices used in making styrene-butadiene emulsions for use in preparing latex paints. Thus, some but not necessarily all of the anionic surfactant is introduced to aid in effecting the desired dispersion and emulsification in carrying out the copolymerization of butadiene and styrene, and the non-ionic surfactant is subsequently added to stabilize the resulting polymer dispersion. The polyorganosiloxane foam depressant and such additional quantities of non-ionic surfactant and anionic surfactant, as are required to complete the cement composition, are subsequently introduced.

Illustrative of non-ionic surfactants are, for example: fatty acid esters such as glycerol monostearate, diethyleneglycol laurate, propyleneglycol monostearate, sorbitol monolaurate, and pentaerythritol monostearate, acid derivatives of ethylene oxide products such as the reaction product of six moles of ethylene oxide with one of oleic acid; condensation products of ethylene oxide with alcohols such as stearyl alcohol; and condensation products of ethylene oxide with phenols, naphthols, and alkyl phenols such as di-t-butylphenoxynonaoxyethylene-ethanol. Preferred are the condensation products of ethylene oxide with alkyl phenols.

Illustrative of anionic surfactants are, for example: the alkyl aryl sulfonates such as dodecylbenzene sodium sulfonate; sulfate derivatives of higher fatty alcohols (i.e., alcohols of at least nine carbon atoms and ordinarily not more than seventeen carbon atoms) such as sodium lauryl sulfate; the sulfonated animal and vegatable oils such as sulfonated fish and castor oils; sulfonated acyclic hydrocarbons; and the like. As pointed out heretofore, at least 15 percent of the anionic surfactant component of the cement additive of the invention should be a sodium higher alkyl sulfate such as sodium lauryl sulfate and preferably the anionic surfactant component consists of a mixture of an alkyl aryl sulfonate surfactant and such sodium alkyl sulfate.

Illustrative of the polyorganosiloxanes are the condensation products resulting from polymerization of organo silane diols, as represented by the formula

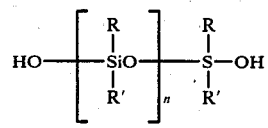

where R and R', in the above formula, represent organic radicals such as alkyl, aryl, aralkyl and alkaryl or heterocyclic groups, and n is one or more. Also useful are polymerization products of organo silane diols in the presence of an organo silane monol, and condensation products obtained from mixtures of organo silane triols, diols, and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids", "silicone emulsions" and "silicone compounds", the latter being siloxanes modified by the addition of a small percentage of finely divided silica or other inert divided solid. Any of these forms can be used in the practice of this invention.

It has further been found to be beneficial, for purposes of obtaining optimum adhesion of the cementitious facing material to the foam surface to coat the foam surface with a substantially continuous coating of the styrene-butadiene-1,3 latex, as described supra, prior to the application of the cementitious facing material. In this regard, the latex coating is preferably not substantially dehydrated prior to application of the cementitious material.

The aggregate employed may be conventionally employed manufactured aggregate or naturally occurring mineral aggregate, such as sand and a mixture of sand with gravel, crushed stone, or equivalent materials.

The cement compositions are made by simply adding the additives to the cement with mixing to obtain a cement mix of desired flow and consistency.

While it is generally convenient to prepare the cement compositions as a unitary product by pre-combining the styrene-butadiene copolymer, non-ionic and anionic surfactant, and polyorganosiloxane foam depressant, and then introducing the resulting mixture into the cement-aggregate mixture in making cement, mortar, or concrete mixes, it will be understood, of course, that it is not necessary that all the various components of the additive be so premixed. For example, equivalent cement, mortar, or concrete mixes are obtained by separate addition of the requisite quantity of styrene-butadiene copolymer emulsion containing sufficient of the anionic and non-ionic surfactants to avoid coagulation of the latex, the polyorganosiloxane foam depressant and such additional non-ionic and anionic surfactants as are necessary.

By way of further illustration, a plurality of individual blocks of closed cell, generally smooth skinned polystyrene foam measuring about 1¼ inches in thickness, 2 feet in width and about 4 feet long, were forwarded along a roll having individual projections thereon, which projections were about ½ inch apart in both directions and about ⅛ inch by ⅛ inch in cross sectional area and 3/16 inches in height. Such projections produced a plurality of indentations in the foam which indentations were in the shape of a trapezoid with the short parallel side of the hole opening at the surface of the foam. Thereafter, a ½ inch coating of a cementitious protective layer was cast on the surface of the foam containing such indentations. The cementitious protective material used was prepared by admixing a type K shrinkage compensating cement with sufficient water to form water to cement ratios of 0.29 to 0.635, a sharp mason sand in amount to provide a sand to cement ratio of about 2.75:1, to 3:1, a styrene-butadiene latex composed essentially of an aqueous emulsion of about 48 weight percent of a solid copolymer of about 66 percent by weight styrene and 34 percent by weight butadiene-1,3; and based on the copolymer weight, about 4.65 percent of the non-ionic surfactant di-t-butylphenoxynonaethylene-ethanol; and about 0.78 percent of a mixture of anionic surfactants comprising predominant amounts of sodium lauryl sulfate and correspondingly lesser amounts of dodecyl-benzene sulfonate, in amount to provide about 15 percent latex solids based on the weight of cement, a polymethylsiloxane foam depressant in amount to provide about 0.4 percent by weight active silicon based on the weight of latex solids, and about 4 pounds of ½ inch long alkali-resistant glass fibers per 94 pounds of cement to furnish restraint. The Type K compensating cement was a mixture of portland cement compounds, anhydrous calcium sufoaluminate $(CaO)_4(Al_2O_3)_3(SO_3)$, calcium sulfate $(CaSO_4)$, and lime $(CaO)$.

The cementitious protective layer was then vibrated to remove entrapped air and to seat a portion of such cementitious layer in the indentations present in the foam.

The so-formed panels were then cured under ambient temperatures.

The cured panels were characterized by being exceptionally resistent to delamination. More particularly, delamination did not occur following 300 temperature cycles of from 15° F to 85° F or following 500 temperature cycles of from 50° F to 140° F.

Further, the cured panels were characterized by a freeze-thaw value of greater than 300 cycles, as determined by ASTM Test No. C-666, i.e. such panels were not significantly deteriorated following such temperature cycling.

A roof structure was prepared using the panels as specifically prescribed above as being representative of the present invention, by mopping a wooden roof deck with a roofing grade asphalt followed by the application of a roofing felt thereto. The procedure was repeated until a water resistant membrane was formed. A plurality of the cement coated foam panels were then adhered (with the cementitious layer on top) to the upper surface of the waterproof membrane by means of hot bitumen having a temperature of about 100° Centigrade.

The resulting roof structure was characterized by having a weight of less than about 5 pounds per square foot and was free from delamination of the cementitious layer from the foam even when exposed to repeated temperature cycles of about 100° F and total temperature differences of up to 200° F. Such roof structure was further characterized by having a Class A fire rating, the capability of sustaining foot traffic and normal loads or impacts without cracking, and of being light in color and thus capable of reflecting sunlight to prevent excessive temperature rise in the insulation.

Further, after an extended period of exposure, portions of the membrane were removed and evaluated for resiliency. The membrane disposed underneath the cement latex modified cement coated foam polystyrene installation was in excellent condition and exhibited no indication of undue hardening. By way of comparison, a similar membrane covered with gravel and having a 2 inch layer of cellular styrene disposed beneath the roof deck showed marked deterioration.

As is apparent from the foregoing specification, the present invention is susceptible of being embodied with various alterations and modification which may differ from those that have been specifically described in the preceding specification and description. For example, the invention encompasses panels having cementitious protective coatings on more than one surface thereof as well as panels having multiple coatings applied using varying embodiments of the present invention.

What is claimed is:

1. A building panel comprising a main body portion of a closed cell, generally smooth skinned styrene polymer foam material having a surface containing one or more regions having indentations therein, said surface having applied thereto a substantially continuous binder coating of a styrene-butadiene copolymer latex consisting essentially of a styrene-butadiene-1,3 copolymer having a styrene to butadiene weight ratio of about 30:70 to 70:30, and based on the weight of said copolymer, (a) from about 2 to about 10 percent of non-ionic surfactant, (b) from about 0.75 to 7.5 percent of anionic surfactant, at least about 15 percent of which is sodium alkyl sulfate in which the alkyl groups contain 9 to 17 carbon atoms, the sum of (a) and (b) not exceeding about 11 percent by weight of said copolymer and the weight ratio of (a) to (b) being within the range of about 0.7:1 to 10:1, and adhered to said binder coating a protective cementitious facing material, a portion of which is contained in said indentations, said facing material consisting essentially of an admixture of portland cement, mineral aggregate and from about 5 to about 25 percent based on the weight of said cement of a styrene-butadiene-1,3 copolymer having a styrene to butadiene weight ratio of about 30:70 to 70:30, water in amount of from about 25 to 65 percent based on the weight of said cement, and based on the weight of said copolymer, (a) from about 2 to about 10 percent of non-ionic surfactant, (b) from about 0.75 to 7.5 percent of anionic surfactant, at least about 15 percent of which is a sodium alkyl sulfate in which the alkyl group contains 9 to 17 carbon atoms, and (c) from about 0.1 to 5 percent of a polyorganosiloxane foam depressant based on the weight of active polyorganosiloxane, the sum of (a) and (b) not exceeding about 11 percent by weight of said copolymer and the weight ratio of (a) to (b) being within the range of about 0.7:1 to 10:1.

2. The building panel of claim 1 wherein the indentations in said foam are undercut indentations which are generally in the shape of a trapezoid with the short parallel side of the indentations opening at the foam surface.

3. The building panel of claim 2 wherein the non-ionic surfactant in said cementitious facing material is di-t-butyl-phenoxynonaoxyethylene-ethanol, the anionic surfactant comprises a mixture of an alkyl aryl sulfonate and a sodium alkyl sulfate and the polyorganosiloxane foam depressant is polymethylsiloxane.

4. The building panel of claim 3 wherein said alkyl aryl sulfonate is dodecylbenzene sodium sulfonate and said sodium alkyl sulfate is sodium lauryl sulfate.

5. The building panel of claim 4, wherein said copolymer in said cementitious facing material is a copolymer of about 66 percent styrene and about 34 percent butadiene.

6. The building panel of claim 5 wherein said portland cement is a shrinkage compensating cement.

7. The building panel of claim 6 wherein said cementitious facing material contains sufficient reinforcement to provide restraint against expansion.

8. The building panel of claim 7 wherein said reinforcement is alkali resistant glass fibers.

* * * * *